United States Patent [19]

Maerfeld

[11] 4,306,456
[45] Dec. 22, 1981

[54] ELASTIC WAVE ACCELEROMETER

[75] Inventor: Charles Maerfeld, Paris, France

[73] Assignee: Thomson-CSF, Paris, France

[21] Appl. No.: 133,958

[22] Filed: Mar. 25, 1980

[30] Foreign Application Priority Data

Mar. 30, 1979 [FR] France .................. 79 08090

[51] Int. Cl.³ .................. G01P 15/08
[52] U.S. Cl. .................. 73/517 R; 73/DIG. 4; 310/313 R
[58] Field of Search ....... 73/517 R, 517 AV, DIG. 4, 73/516 R; 310/313 R, 313 B, 313 D, 329, 328, 338

[56] References Cited

U.S. PATENT DOCUMENTS

| | | | |
|---|---|---|---|
| 2,928,668 | 3/1960 | Blasingame | 73/517 AV |
| 3,002,391 | 10/1961 | Holmes | 73/517 AV |
| 3,010,325 | 11/1961 | Harkness | 73/517 AV |
| 3,023,627 | 3/1962 | Geyling | 73/517 R |
| 3,863,497 | 2/1975 | van de Vaart | 73/517 R |
| 3,961,293 | 6/1976 | Hartmann et al. | 310/313 D X |
| 4,096,740 | 6/1978 | Sallee | 310/313 B X |

*Primary Examiner*—James J. Gill
*Attorney, Agent, or Firm*—Roland Plottel

[57] ABSTRACT

The invention discloses an elastic wave accelerometer for measuring acceleration at least in one direction.

The device comprises a solid support, a seismic mass and a piezoelectric wafer embedded in the seismic mass and in the solid support. An acceleration in one direction in the plane of the wafer produces an extension in one portion of the wafer and a compression in the other. Elastic waves are excited in the two portions of the wafer. Two oscillators are obtained by means of amplifiers and the frequency difference between the two oscillators is proportional to the acceleration.

The invention applies to accelerometers for inertial navigation.

22 Claims, 11 Drawing Figures

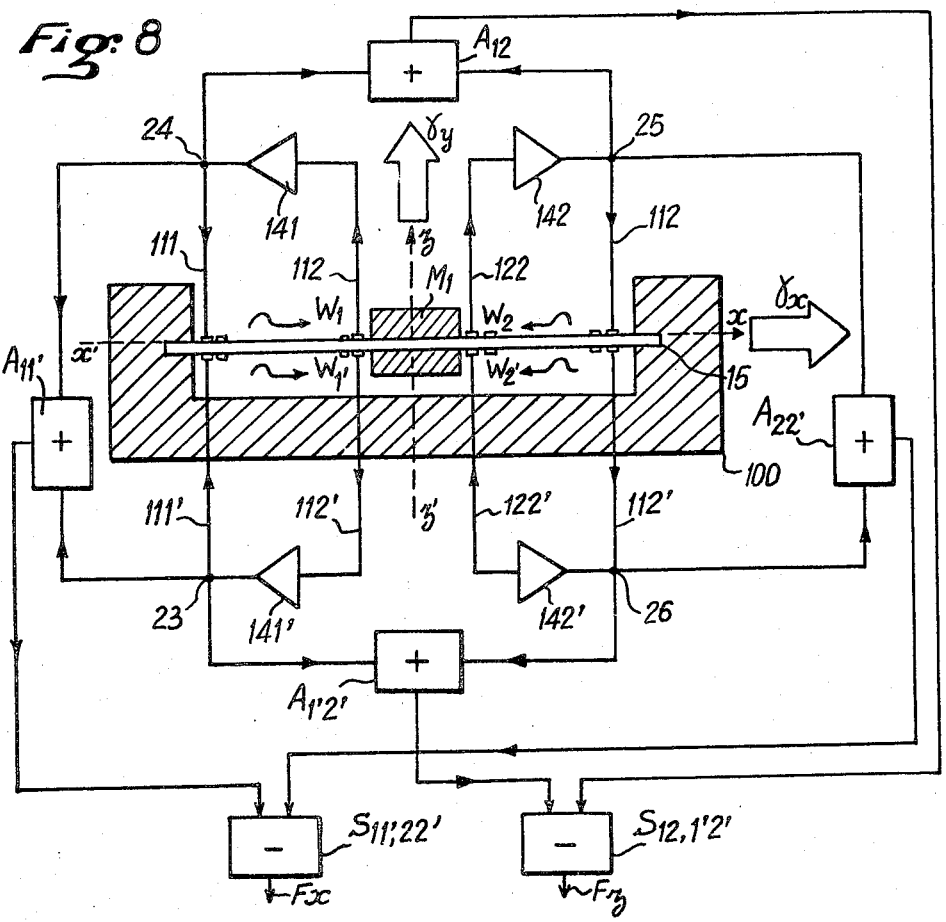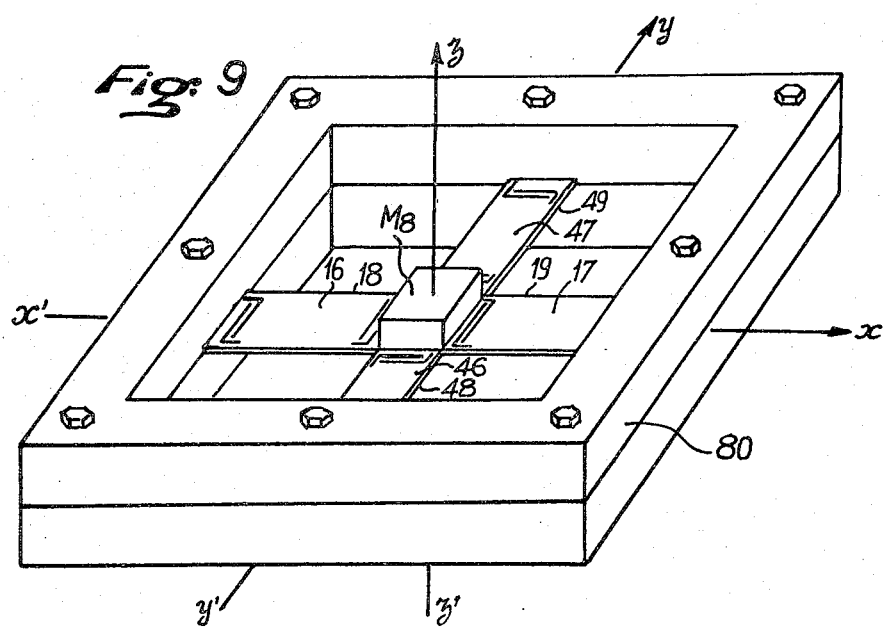

ELASTIC WAVE ACCELEROMETER

BACKGROUND OF THE INVENTION

The present invention relates to devices for measuring by means of elastic waves the acceleration of a moving body, the accelerometers being connected to this moving body.

Measuring the acceleration by the inertial force exerted by a mass called seismic mass is known.

Measuring forces by the frequency variation of elastic wave oscillators subjected to this force is also known. Devices for measuring the forces applied to a flexed piezoelectric wafer having acoustic surface wave delay lines on each of its faces are described in U.S. Pat. No. 3,878,477 filed on Jan. 8, 1974 in the name of Hewlett-Packard.

The force applied in these devices is perpendicular to the wafer and it is measured by the frequency difference between the two oscillators comprising these acoustic lines.

The performance of an accelerometer comprising a seismic mass exerting a force on a wafer having delay line oscillators on both its faces is defined, on the one hand, by the sensitivity expressed as a frequency variation per unit of acceleration (generally 9.81 m/sec² is taken) and, on the other hand, by the passband B of the accelerometer, when the acceleration varies as a function of time.

The disadvantage of an accelerometer comprising a wafer subjected to flexing is that it only allows passbands of a few hundred Hz, if not the sensitivity becomes too low and this despite the spectral purity of the surface wave oscillators.

Another disadvantage is that the flexure stresses undergone by the wafer are not homogeneous either in the direction of propagation of the waves or in the thickness of the substrate.

The accelerometer of the invention does not have these disadvantages and, in particular, it enables good sensitivity to be obtained for passbands as high as 10 kHz.

The accelerometer of the invention comprises a wafer which, on account of the inertial forces, has one part compressed and the other extended. To each one of the two parts there corresponds a surface wave oscillator. The device of the invention has moreover the advantage of an homogeneous stress which improves the spectral purity of the oscillator.

SUMMARY OF THE INVENTION

Briefly, the accelerometer of the invention is an elastic wave accelerometer, comprising a solid support, at least one wafer capable of propagating elastic waves as well as means for forming therewith at least two acoustic filters, said wafer being embedded in the solid support as well as in at least one seismic mass and means for measuring phase variations of these acoustic filters or frequency variations of oscillators formed by the filters associated with amplifiers, wherein the assembly of the seismic masses and the embedments of a wafer at least in the solid support delimit at least two portions in this wafer with which are formed at least two elastic wave filters and under the effect of the component of an acceleration in the direction of propagation of the elastic waves, the two portions being deformed in this direction, one being extended (or compressed), the other compressed (or extended), a differential measure of these two deformations supplying the value of the component of the acceleration in the direction of propagation of the elastic waves.

The above and other objects, features and advantages of the present invention will become apparent from the following description, given solely by way of non-limiting illustration, when taken in conjunction with the accompanying drawings.

DESCRIPTION OF THE DRAWINGS

FIG. 8 is a diagram for measuring the acceleration in two directions in accordance with the invention.

FIG. 9 is a diagram for measuring the acceleration in three directions in accordance with the invention.

DESCRIPTION OF THE PREFERRED EMBODIMENTS

It is known that an accelerometer comprises a seismic mass m connected to a frame integral with the moving body, by means of a resilient element having a stiffness k. It is known that the resonant frequency $F_r$ of such a system is given by:

$$F_r = \frac{1}{2\pi} \sqrt{\frac{k}{m}}$$

If the moving body is subjected to an acceleration $\gamma(t)$ which depends on time t, the mass will move in relation to its position of equilibrium in the absence of an acceleration of a length r(t). For there to be proportionality between r(t) and $\gamma(t)$ the cut-off frequency $F_c$ of the spectrum of $\gamma(t)$ must be such that $F_c << F_r$ and in this case we have:

$$r(t) = \frac{\gamma(t)}{4\pi^2 F_r^2}$$

If it is desired to measure accelerations which vary rapidly, the resonant frequency must be large.

For the accelerometer of the invention, the movement r of the seismic mass produces a frequency variation $\Delta f$ of an elastic wave oscillator at the frequency f. This frequency variation $\Delta f$ being proportional to the displacement of r. The sensitivity S of such an accelerometer may be defined by:

$$S = \frac{\Delta f}{f} / \gamma = \frac{a}{F_r^2}$$

where a is a constant.

The result is that for an accelerometer with a wide passband the sensitivity is low. Furthermore, the minimum detectable acceleration $\delta\gamma$ is given by $\delta\gamma=(\delta f/f)/S$, where $\delta f/f$ is the spectral purity of the oscillator, which shows the interest of an oscillator having great spectral purity and, on the other hand, for a given passband, of great sensitivity.

The surface wave oscillators may have great spectral purity and so are particularly interesting for acceleration measurements.

Figure 1:
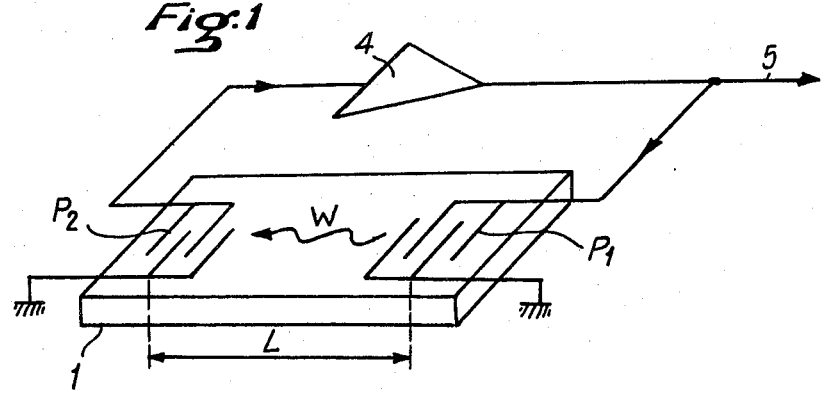
FIG. 1 is a simplified diagram of a delay line oscillator.

FIG. 1 shows the diagram of such an oscillator. On substrate 1 which is generally a thin piezoelectric crystal wafer are deposited interdigital transducers $P_1$ and $P_2$. An elastic surface wave W being propagated from transducer $P_1$ towards transducter $P_2$ supplies an electric signal amplified by high-gain amplifier 4. The amplified signal is fed to transducter $P_1$, on the one hand, and to a user output 5, on the other.

The oscillation frequency is determined by the relationship:

$$f_o = V/L(n-\phi_o/2)$$

where V is the speed of the waves over the mean path, of length L, $\phi_o$ the phase shift produced by amplification 4 and by the transducters and n is an integer. n is determined by the mode of propagation, by the dimensions and the shapes of transducters $P_1$ and $P_2$. The frequencies of oscillation are generally between a few tens and a few hundred MHz.

Under the effect of an external physical magnitude such as temperature, pressure or force, the substrate is deformed; this deformation modifies the frequency of the oscillator for, on the one hand, the length L and, on the other hand, the speed of propagation V vary.

In the prior art, particularly in U.S. Pat. No. 3,878,477 mentioned above, the force is measured by a deformation of the substrate under flexure.

Figure 2:
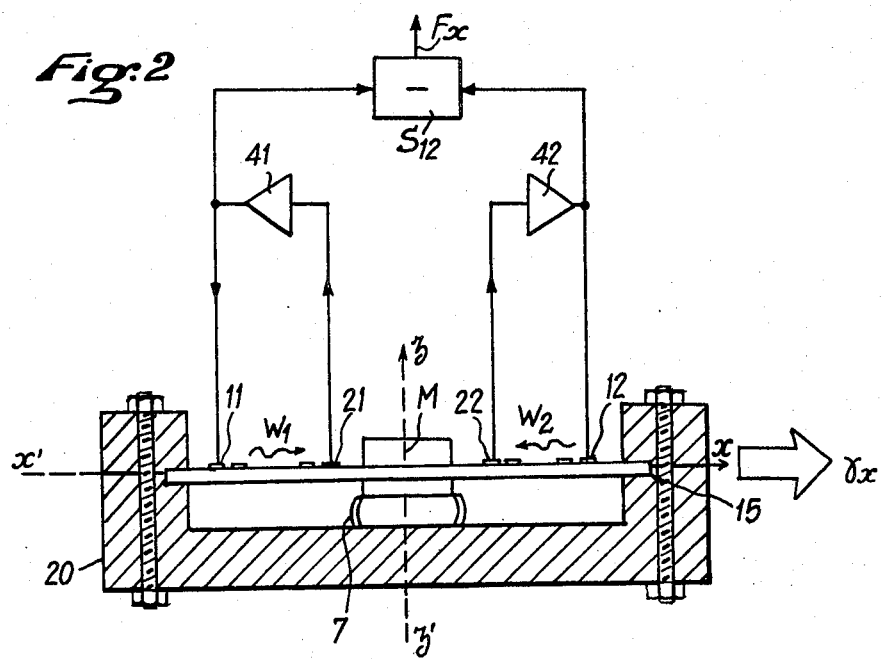
FIG. 2 is a simplified diagram for measuring acceleration in one direction, in accordance with the invention.

FIG. 2 shows one embodiment of the accelerometer with a thin wafer under extension and compression in accordance with the invention. FIG. 2 shows the basic device of the invention. It comprises a piezoelectric monocrystal 15, for example of quartz or Lithium Niobate, whose ends are embedded in a solid support 20. In the middle of the wafer is placed an inertia block M disposed advantageously in two parts on each side of the wafer. This inertia block is rigidly connected to the wafer; it is furthermore connected to the support by means of flexible connections 7 which ensure the suspension thereof. The wafer is divided into two parts of equal length L, with which two elastic wave oscillators are formed. In the embodiment shown in FIG. 2, they are delay line oscillators using surface elastic waves (Rayleigh type) as shown in FIG. 1.

On the surface of wafer 15 are symmetrically disposed in relation to axis zz', perpendicular to the wafer passing through the center of intertia block M, electrodes or transducters in the form of inte interdigital fingers 11, 21, 12 and 22.

Surface waves $W_1$ and $W_2$ are propagated, on the one hand, between electrodes 11 and 21 forming with amplifier 41 a first oscillator $O_1$ and, on the other hand, from electrode 12 towards 22 forming with amplifier 42 a second oscillator $O_2$ identical to the first one. Furthermore, the outputs of amplifiers 41 and 42 are connected to a frequency subtracter $S_{12}$ supplying at its output $F_x$ the signal for measuring the acceleration.

When the device is not subjected to an acceleration, the two oscillators $O_1$ and $O_2$ maintain oscillations of a frequency equal to $f_o$, so that at the output of frequency subtracter $S_{12}$ the value of the signal is zero.

Figure 3:
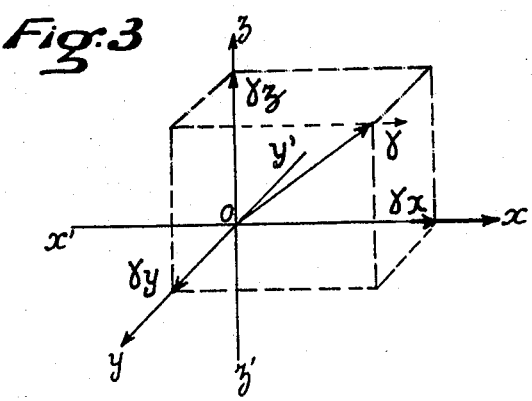
FIG. 3 shows a coordinate system with the components of acceleration.

If the device is subjected to an acceleration $\vec{\gamma}$, directed for example towards the right as shown in FIG. 3, the component $\gamma_x$ along axis xx' causes a force $m\gamma_x$ on the seismic mass formed by inertia block M of mass m, which results in the left-hand portion of wafer 15 being compressed and the right-hand portion expanded in the direction of propagation of the elastic waves. The result is variations in length and in the speed of propagation of the waves in the two portions, which cause a variation $\Delta f$ of frequency $f_o$ of the two oscillators $O_1$ and $O_2$ equal in value and opposite in sign. The frequency subtracter $S_{12}$ supplies the signal at the frequency $F_x = 2\Delta f$ measuring the acceleration $\gamma_x$.

The component $\gamma_z$ of the acceleration along axis zz', applies a vertical force to the inertia block which results in the two portions of the wafer being flexed symmetrically towards the center. The variations in the frequency $f_o$ which result therefrom are equal in value and of the same sign. The subtracter $S_{12}$ supplies then a zero indication of the acceleration $\gamma_z$ along axis zz'.

It is desirable to limit the amplitude of the deformations under flexure of wafer 15 and, for this, the suspension 7 is formed so as to have high rigidity along axis zz', for example by means of wafers forming springs or else by a ball or needle bearing. In some cases where the seismic mass remains small, this suspension may be omitted.

As for component $\gamma_y$, the force applied generates a very small amplitude flexure since the geometry of the wafer and the variations of frequency $f_o$ which may result therefrom supply, for the same reasons as during an acceleration along zz', a zero indication of acceleration along yy'.

Similarly, under the effect of a variation in the ambient temperature, which leads to expansion of the wafer, variations in frequency $f_o$, equal and of the same sign, are obtained giving a zero indication at the output.

Figure 4:
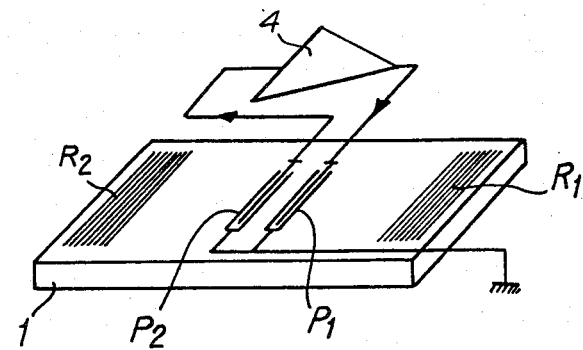
FIG. 4 is a simplified diagram of a resonator surface wave oscillator.

The device described in accordance with the invention has then a single sensitive axis in the direction of propagation of the acoustic waves. The device shown in FIG. 2 is formed with two delay line oscillators as shown in FIG. 1. There exist other types of oscillators, using resonator-based surface elastic waves. FIG. 4 shows a resonator oscillator. At the surface of a substrate 1 are etched two gratings $R_1$ and $R_2$, the lines of which are for example engraved furrows having a periodicity P. These gratings are reflectors about a frequency $f = V/2P$ and delimit a resonating cavity in which a stationary wave mode of operation is established. Two transducters $P_1$ and $P_2$ disposed at the surface of this substrate are connected to an amplifier 4 whose output supplies an electric signal of a given frequency and more stable than in the case of the delay line oscillators. For that, the device shown in FIG. 2 and comprising two resonator oscillators as shown in FIG. 4, is a preferred embodiment of the invention.

It is also possible to use the known assembly of resonator circuits comprising only a single transductor in the cavity.

Furthermore, in the case where resonator oscillators are used, better results are obtained under compression-extension than under flexure. In fact, obviously, the deformation under flexure causes different spacings of the two engraved gratings ($R_1$, $R_2$) and deforms the "resonating cavity", which reduces the passband and the dynamics of the accelerometer. On the other hand, under compression-extension, since the deformation is homogeneous, this disadvantage does not exist.

The advantage of the compression-extension accelerometer in relation to the flexure accelerometer of the prior art, will be better understood by a comparison of the performances of these two devices.

The sensitivity S of an accelerometer being the value of the variation of the physical magnitude measured per unit of acceleration; for example in the case of the device shown in FIG. 2, $S = \Delta f / f \gamma$. The variation of the physical magnitude, for example the frequency of oscillation, is proportional to the stress T defined as being the force per unit of section, so that the sensitivity may be expressed by the ratio $T/\gamma$ ($\gamma$ being the component along one of the axes x, y, z) within a coefficient of proportionality.

Figure 5:
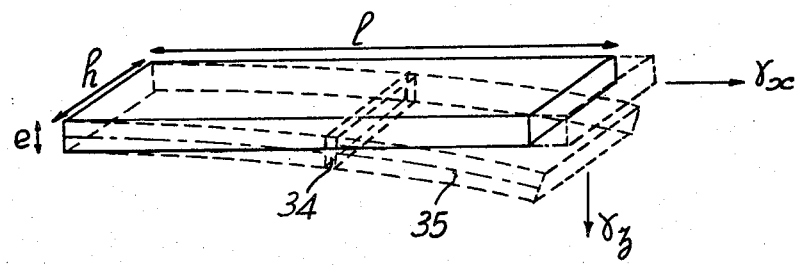
FIG. 5 shows a wafer flexed and extended.

FIG. 5 shows a thin wafer of length l, width h and thickness e subjected either to flexure at 35 by an acceleration $\gamma_z$, or to an extension by an acceleration $\gamma_x$, called $T_e$. If s is the module of compliance along xx' of the material forming the wafer, the expressions of stress T, the coefficient of stiffness k and the sensitivity expressed as a function of $\omega_r^2 = k/m$, where $\omega_r = 2\pi F_r$ is the resonant pulsation, are for the operating modes contemplated:

| Compression-Extension | Flexure |
|---|---|
| $T_e = \dfrac{m\gamma_x}{eh}$ | $T_f = \dfrac{3\rho m\gamma_z}{e^2 h}$ |
| $k_e = \dfrac{1}{s} \dfrac{eh}{\rho}$ | $k_f = \dfrac{h}{4s}\left(\dfrac{e}{\rho}\right)^3$ |
| $S_e = \dfrac{b}{s\rho\omega_r^2}$ | $S_f = \dfrac{b}{s\rho\omega_r^2}\left(\dfrac{3}{2}\dfrac{e}{\rho}\right)$ | where stress $T_f$ for the flexure mode is considered at the surface, where it is maximum for an element situated at l/2, such as at 34 in FIG. 5, and where b is the coefficient of proportionality between the voltage and the physical magnitude measured. $k_e$ and $k_f$ are the stiffnesses corresponding respectively to the compression-extension and to the flexure. $S_e$ and $S_f$ are the corresponding sensitivities.

It can be seen that the sensitivity for the flexure mode $S_f$ corresponding to a force $m\gamma_z$ is greater than the sensitivity $S_e$ corresponding to a force $m\gamma_x$ in the compression-extension mode since e is clearly smaller than l. On the other hand, the sensitivity in relation to the acceleration for a given resonant frequency, i.e. $\omega_r$, is greater in the compression-extension mode than in the flexure mode. In other words, for the same sensitivity, the passband in the compression-extension mode is greater which is an important advantage of the invention.

For example, if we consider a quartz wafer of a thickness of 200 μm, a length of 10 mm and a width of 2 mm used with a mass of 20 grams, we obtain a resonant frequency $F_r$ of 2800 Hz for the compression-extension mode. The sensitivity obtained is close to 3000 Hz/g for an oscillation frequency of 100 MHz (g=9.81 m/sec$^2$).

The oscillators described above have a spectral purity measured by the mean square deviation of the relative frequency fluctuations, of the order of $10^{-10}$ in the short term; such results are described particularly in the article by E. Karrer and R. Ward published in ISA Transactions, volume 6 (1977) page 90. The smallest measurable acceleration is then of the order $10^{-5}$ g.

Furthermore, for an acceleration of 100 g, the stress applied is equal to 2.3 Pa which is a value very much lower than the elastic-stress limit of crystals in general.

The same device used in the flexure mode would have a resonant frequency of 20 Hz.

On the other hand, with a device comprising a wafer having a length of 10 mm, a width of 15 mm and a thickness of 1 mm, used with a mass of 1 gram under flexure, a resonant frequency $F_r$ is obtained close to that obtained with the preceding device under compression-extension; but its sensitivity is only equal to 130 Hz/g.

The device shown in FIG. 2 may be advantageously implemented not by using surface elastic waves of the Rayleigh type but pure shearing waves having a volume or surface such as the waves of the Bleustein-Gulyaev (B.G.) type, described in an article by J. L. Bleustein published in "Applied Physical Letters", volume 11, (1968), page 412, or the so-called "Skimming Bulk Waves" (S.B.W.) described in an article by H. Lewin in "Ultrasonic Symposium Proceedings" IEEE 1977, page 744, and of the Auld type which are relatively penetrating. To obtain such waves, the crystal forming the wafer must be orientated along its axis, these waves being propagated parallel to the surface in the direction of application of the compression/extension force. Moreover, for the Auld type waves, the substrate comprises a periodic grating engraved on the surface.

According to the invention, the use of volume elastic waves is possible because the stress undergone by the wafer propagating the waves is homogeneous in volume, particularly when the direction of application of the acceleration is along the axis xx'. On the other hand, for flexure accelerometers, this stress is not homogeneous in the volume; there is extension of the substrate above the neutral fiber of the flexed wafer (FIG. 5), and a compression underneath.

The use of this type of wave in place of the Rayleigh waves gives, for the same power density, greater energy stored in the crystal and so a better spectral purity of the oscillator. Furthermore, the pure shearing waves of the B.G. or Auld type are, along certain sections, less sensitive to temperature variations than the Rayleigh waves, which is an additional advantage.

Figure 6:
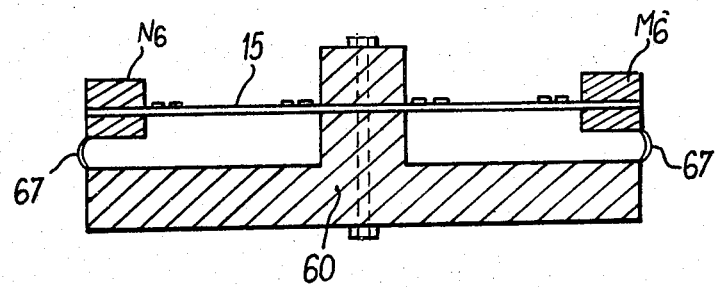
FIG. 6 is a diagram of an extension-compression accelerometer in accordance with the invention.

The device shown in FIG. 6 forms another embodiment whose operation is based on the same principle as the basic device. Frame 60 forms a central pillar in which is embedded the substrate in the form of a wafer 15 whose ends support the seismic masses M6 and N6 connected by a flexible suspension 67 to frame 60. The other elements of the device not shown remain unchanged in relation to FIG. 2.

According to another variation, the measurement of the variation of the oscillation frequency of each oscillator may be replaced by the measurement of the variation of the phase or of the delay time of the signals at the output of each oscillator; each oscillator forms a filter whose central frequency is the oscillation frequency.

According to another variation of the invention, a generator lying outside the frequency $f_g$ is connected to the input transductors. The electrical signal provided by the output transductor is compared in phase or in delay with that of the input. Thus frequency measurements are replaced by phase or delay time measurements.

Figure 7:
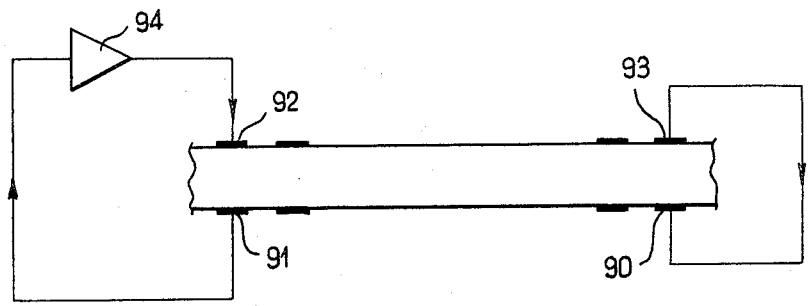
FIG. 7 shows a wafer supporting elastic waves on its upper and lower surfaces.

In a variation of the device shown in FIG. 2, oscillators $O_1$ and $O_2$ are formed by using also the elastic waves which may be propagated by the lower face of each portion of wafer 15 as shown in FIG. 7, for one portion. Two transducters 90 and 91 are disposed on the lower face opposite transducters 93 and 92 on the upper face of the wafer and transducters 93 and 90 are connected together. Thus an oscillator is formed comprising two delay lines in series by connecting the amplifier 94 to transducters 91 and 92. The performances of such an oscillator are better in the "signal to noise" ratio. However, the use of the two faces of the wafer involves restrictions as to the type of acoustic waves generated. Interference of the waves propagated in the thickness of the wafer should be avoided, i.e. only surface waves of the Rayleigh type or surface waves should be used provided however that the wafer is not too thin. With the sensitivity increasing when the thickness of the wafer diminishes, non-interference requires the frequency of the surface waves being increased for a smaller penetration of these latter. A compromise exists between this frequency and the acoustic absorption of the substrate.

By combining the deformations under extension-compression and under flexure of the wafer, there is obtained in accordance with another embodiment of the invention a device measuring the acceleration in two directions xx' and zz'. This device is shown in FIG. 8.

Elastic waves $W_1$ and $W_2$ being propagated on the two portions of the upper face of the wafer are used to obtain, through amplifiers 141 and 142, the oscillators $O_1$ and $O_2$. Similarly, the elastic waves $W_1'$ and $W_2'$ of the lower face are used by amplifiers 141' and 142' to form the oscillators $O_1'$ and $O_2'$.

These oscillators $O_1$, $O_2$, $O_1'$, $O_2'$ form a unit in which the combination of the variations of the oscillation frequencies with the deformations under compression-extension and under flexure, enables the differential measure of the components of acceleration $\gamma_x$ and $\gamma_z$ to be obtained.

The outputs 24, 23 of oscillators $O_1$, $O_1$, and the outputs 25, 26 of oscillators $O_2$, $O_2'$ are connected respectively to two frequency adders $A_{11}'$ and $A_{22}'$ which are connected to a frequency subtracter $S_{11',22'}$. Also the outputs 24, 25 of oscillators $O_1$, $O_2$ and the outputs 23, 26 of oscillators $O_1'$, $O_2'$ are connected respectively to two frequency adders $A_{12}$ and $A_{1'2'}$ which are connected to another frequency subtracter $S_{12, 1'2'}$. Furthermore, the suspension connecting inertia block $M_1$ rigidly to the support along axis zz' is omitted.

Under the action of the force along the axis xx', the deformation of the wafer under compression-extension leads to the measurement of the acceleration $\gamma_x$ according to the same procedure as for the device shown in FIG. 2, with a double frequency deviation $4\Delta f_x$ at the output $F_x$. Under the action of the force along axis zz', the deformation of the wafer under flexure leads to the measurement of the acceleration $\gamma_z$. In fact, the two portions of the wafer flex towards the seismic mass with an equal amplitude causing on each side of the neutral fiber stresses respectively under extension and under compression; the variations of the oscillation frequencies corresponding to the oscillators using the elastic surface waves on each side of the neutral fiber are also equal and of the the opposite sign. This operation is of course well-known in the prior art. Consequently, such as the device shown in FIG. 8 is constructed, the acceleration $\gamma_z$ is measured at output $F_z$ with a frequency deviation $4\Delta f_z$.

This device is characterized by the fact that it possesses two independent axes of sensitivity along xx' and zz', the measurements being obtained in a differential manner.

To measure the component of acceleration $\gamma_y$ along yy', a second accelerometer may be used identical to the one shown in FIG. 8, the two accelerometers being placed along two perpendicular axes; they supply two values of $\gamma_z$ which may be averaged for example in order to improve the accuracy.

For measuring this component $\gamma_y$ another device has been constructed in accordance with the invention such as shown in FIG. 9. About a single seismic mass $M_8$ and a frame 80, for example square in shape, two wafers are placed along two perpendicular axes xx' and yy'. Similarly as for the device shown in FIG. 8 the values of the components of acceleration $\gamma_x$ and $\gamma_z$ are obtained by means of the frequency variations of the four oscillators $O_1$, $O_2$, $O_1'$ and $O_2'$. The oscillators $O_1$ and $O_2$ correspond to the portions 16 and 17 of the upper face of the wafer directed along x and the oscillators $O_1'$ and $O_2'$ to the portions 18 and 19 of the lower face of this wafer, whereas the values of components $\gamma_y$ and $\gamma_z$ are obtained from the frequency variations of four oscillators $O_3$, $O_4$, $O_3'$, $O_4'$ on the portions 46, 47, 48, 49 on the wafer along axis yy'. The value of component $\gamma_z$ is advantageously obtained by taking the sum of the output frequencies for oscillators $O_1$, $O_2$, $O_1'$, $O_2'$, on the one hand, and the sum of the output frequencies of oscillators $O_3$, $O_4$, $O_3'$, $O_4'$, and on the other hand by taking the difference of the two frequencies thus obtained; the accuracy on the vertical acceleration $\gamma_z$ is thus doubled.

According to a variation, the solid support 80 is annular in shape. According to another variation, the solid support 80 is of the type shown in FIG. 6.

Figure 10:
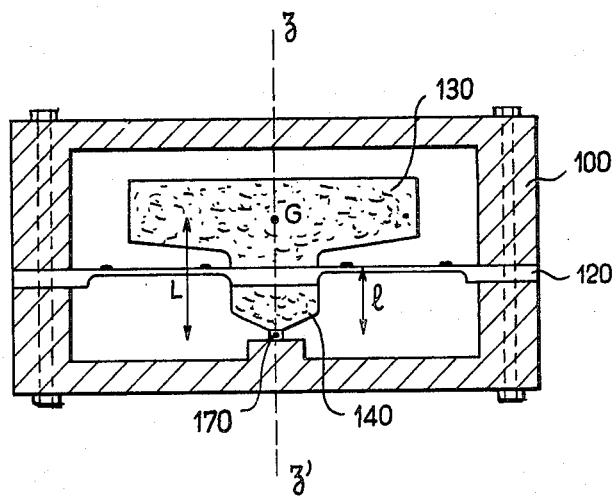
FIGS. 10 and 11 show embodiments of the accelerometer of the invention.

Another type of construction is shown in FIG. 10. It allows multiplication of the stresses exerted at the level of the wafer. The device comprises between the base of the solid support 100 and the wafer an axis of rotation 170 perpendicular to the axis zz'. On the one hand, there is placed between the axis of rotation and the wafer a first seismic mass of mass $m_1$, 140, rigidly fixed to the lower face of the wafer and, on the other hand, a second seismic mass of mass $m_2$, 130, is rigidly fixed to the upper face of the wafer. This second mass is greater than the first so that the center of gravity G of the assembly of the seismic masses is placed above the wafer on axis zz'.

If L and l are respectively the distances from the center of gravity and from the wafer in relation to the axis of rotation, the moments of inertia are $m_1 l^2 + I_o$ and $m_2 L^2 + I_o$ where $I_o$ is the moment of inertia in relation to the center of gravity. In an approximate way, stress T which corresponds to an acceleration $\gamma_x$ along xx' is expressed by: $m\gamma/eh \times L/l$ whereas the resonance pulsation is of the order of $2eh/slm(l/L)^2$ where m is the assembly of the seismic masses. Consequently, from the point of view of the passband, these accelerometers are less advantageous.

Figure 11:
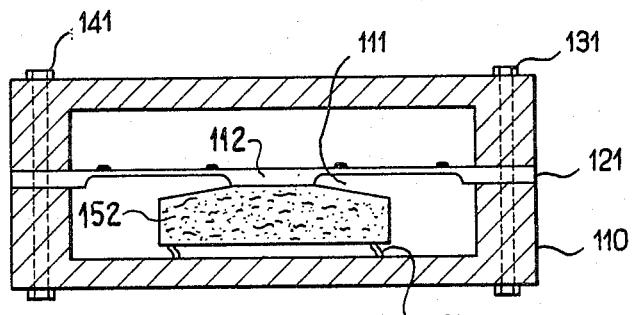

According to a preferential embodiment of the invention, the devices shown in FIGS. 2, 6, 8, 9, 10 are constructed so that wafer 121 (FIG. 11) is monolithic. To this end, the portions for propagating the elastic waves are made from a thick piezoelectric crystal wafer, for example made of quartz or Lithium Niobate, about a millimeter thick in which portions are hollowed out until a profile, such as 111 shown in FIG. 11, is obtained with a thickness in the center of the order of 100 $\mu$m. The hollowing may be carried out by ionic bombardment machining, by mechanical machining or by chemical machining.

In the embodiment shown in FIG. 11, the seismic mass 152 is welded directly to the central part 112 of the machined wafer 121. The wafer is embedded by means of bolts such as 141 and 131; a suspension 151 prevents rotational movements of this mass. Advantageously, a system (not shown) enables the wafer 121 to be prestressed longitudinally.

Finally, in accordance with a variation of the invention, the acceleration in one direction is measured by replacing the wafer by means of a cord capable of propagating shearing waves.

It is apparent that within the scope of the invention, modifications and different arrangements can be made other than are here disclosed. The present disclosure is merely illustrative with the invention comprehending all variations thereof.

What is claimed is:

1. An elastic wave accelerometer comprising:
   (a) a piezoelectric substrate thin wafer;
   (b) support means for mounting said wafer and including at least one seismic mass, said support means delimiting two portions on the surface of said wafer;
   (c) surface acoustic wave transducer means disposed on at least one face of said wafer, for forming an acoustic delay line or filter on each portion of said two portions, with the waves on said portions propagating in opposite directions, said waves being effected by the component of an acceleration applied to the accelerometer in the direction of propagation of the elastic waves, said two portions being deformed in said direction one by extension and the other by compression;
   (d) means for measuring said extension and compression in each portion of said delay line or filter, including oscillators having amplifier means connected to said delay lines or filters for forming oscillations in each portion in accordance with said extension and compression;
   (e) frequency subtraction means for giving the difference of frequency of the two oscillators corresponding to said two delay lines or filters, said frequency difference being proportional to the acceleration parallel to said propagation direction of said two waves.

2. The accelerometer as claimed in claim 1, wherein said support means includes a support, and said wafer has two ends which are rigidly embedded in edges of said support; said one seismic mass being placed at an equal distance from the embedded ends and rigidly connected to said wafer.

3. The accelerometer as claimed in claim 1 wherein said support means comprise a pillar, said wafer being embedded rigidly in said pillar, and two seismic masses being connected rigidly on two ends of said wafer.

4. The accelerometer as claimed in claim 1, wherein said acoustic filters comprise resonators, with each of the portions of said wafer comprising at each end two engraved reflecting gratings.

5. The accelerometer as claimed in claim 4 wherein, at the end opposite the grating of each wafer portion, electro-acoustic transducers are disposed, one serving as input, the other as output for the electric signals.

6. The accelerometer as claimed in claim 4, wherein a single transducer is disposed between said two gratings and serves as input and output for the electric signals.

7. The accelerometer as claimed in claim 1, wherein each filter comprises an input transducer and an output transducer and wherein said amplifier means has an output signal connected to the output transducer thus forming said oscillator.

8. The accelerometer as claimed in claim 7, wherein the two oscillators corresponding to each portion of said wafer are connected to said subtraction means supplying the frequency difference of the two oscillators.

9. The accelerometer as claimed in claim 1, wherein each acoustic filter comprises an input transducer and an output transducer, wherein the input transducer is connected to an electric signal sinusoidal oscillator and wherein the electric signal collected at the output transducer is applied to said subtraction means.

10. The accelerometer as claimed in claim 9, wherein the phase shift values corresponding to each said wafer portion are applied to circuits supplying the phase shift difference of these portions.

11. The accelerometer as claimed in claim 1, wherein said filters are connected to circuits for measuring their delay time as well as to circuits supplying the difference of the delay time of the filters of the two portions.

12. The accelerometer as claimed in claim 1, wherein the said waves are excited elastic waves which are surface waves of the Rayleigh type.

13. The accelerometer as claimed in claim 1, wherein said waves are excited elastic waves which are volume waves of the Bleustein-Gylyaev type or S.B.W. (Skimming Bulk Waves).

14. The accelerometer as claimed in claim 1, wherein the waves are excited waves which are volume waves of the Anld type.

15. The accelerometer as claimed in claim 1, wherein said support means comprise a blade or ball or needle bearing suspension allowing said seismic mass to move along an axis parallel to the direction of propagation of the acoustic waves of the wafer.

16. The accelerometer as claimed in claim 1, wherein, on each of said wafer portion, there are disposed on the two faces acoustic lines formed by input and output transducers.

17. The accelerometer as claimed in claim 6, wherein the output transducer of one face of a wafer portion is connected to the input transducer of the opposite face of the same portion and wherein the two lines form a single filter.

18. The accelerometer as claimed in claim 16, wherein the acoustic lines disposed on said two wafer portions and on the two faces form four filters and wherein said wafer is embedded in a seismic mass able to have movements parallel to the wafer and perpendicular to this wafer.

19. The accelerometer as claimed in claim 18, wherein, to each of the four filters, there corresponds an oscillator, wherein these oscillators are connected to frequency addition and subtraction means and supply proportional frequencies, one to the acceleration along an axis xx' parallel to the wafer, the other to the acceleration along an axis zz' perpendicular to the wafer.

20. The accelerometer as claimed in claim 18, wherein two blades placed along the direction xx' and the other along a perpendicular yy' are embedded in said seismic mass and each having four filters associated with oscillators and wherein these eight oscillators are connected to circuits supplying the frequency sums connected to circuits supplying frequency differences for determining the accelerations along directions xx', yy' and zz'.

21. The accelerometer as claimed in claim 1, wherein said wafer and the seismic mass are obtained by ionic or chemical machining from a monolithic block.

22. The accelerometer as claimed in claim 1, wherein two seismic masses are provided, the first being welded below said wafer, the second being welded above the wafer on the same vertical axis of symmetry, an axis of rotation at the base of the first mass being orthogonal to the axis of symmetry and supported by the solid support, the value of the first mass being less than the value of the second mass.

* * * * *